(12) United States Patent
Högasten et al.

(10) Patent No.: US 10,623,667 B2
(45) Date of Patent: Apr. 14, 2020

(54) HIGH DYNAMIC RANGE RADIOMETRIC THERMAL VIDEO OVER LOW BITRATE INTERFACE

(71) Applicant: FLIR Systems, Inc., Wilsonville, OR (US)

(72) Inventors: Nicholas Högasten, Santa Barbara, CA (US); Per Elmfors, Goleta, CA (US)

(73) Assignee: FLIR SYSTEMS, INC., Wilsonville, OR (US)

(*) Notice: Subject to any disclaimer, the term of this patent is extended or adjusted under 35 U.S.C. 154(b) by 0 days.

(21) Appl. No.: 15/922,512

(22) Filed: Mar. 15, 2018

(65) Prior Publication Data

US 2018/0205894 A1 Jul. 19, 2018

Related U.S. Application Data

(63) Continuation of application No. PCT/US2016/052017, filed on Sep. 15, 2016.

(60) Provisional application No. 62/220,779, filed on Sep. 18, 2015.

(51) Int. Cl.
| | | |
|---|---|---|
| H04N 5/33 | (2006.01) | |
| H04N 19/186 | (2014.01) | |
| H04N 19/184 | (2014.01) | |
| H04N 19/30 | (2014.01) | |
| G06T 5/00 | (2006.01) | |

(52) U.S. Cl.
CPC .............. *H04N 5/33* (2013.01); *G06T 5/007* (2013.01); *H04N 19/184* (2014.11); *H04N 19/186* (2014.11); *H04N 19/30* (2014.11); *G06T 2207/10048* (2013.01); *G06T 2207/20208* (2013.01)

(58) Field of Classification Search
CPC ........ H04N 5/33; H04N 19/186; H04N 19/30; H04N 19/184; G06T 5/007; G06T 2207/20208; G06T 2207/10048
USPC .......................................................... 348/164
See application file for complete search history.

(56) References Cited

U.S. PATENT DOCUMENTS

| | | | |
|---|---|---|---|
| 6,028,309 A | 2/2000 | Parrish et al. | |
| 6,057,551 A * | 5/2000 | Tararine | G01T 1/2985 |
| | | | 250/363.03 |

(Continued)

FOREIGN PATENT DOCUMENTS

| | | | |
|---|---|---|---|
| CA | 2936313 | 7/2015 | |
| CA | 2936313 A1 * | 7/2015 | ............. H04N 19/46 |

(Continued)

*Primary Examiner* — Shan E Elahi
(74) *Attorney, Agent, or Firm* — Haynes and Boone, LLP

(57) ABSTRACT

Various embodiments of the present disclosure may include an imaging system that allows for the transfer of high dynamic range (HDR) radiometric thermal images over a low bitrate interface. The image system may capture HDR images and output the HDR images over a communications interface to be processed. The HDR images may be converted to low dynamic range (LDR) images by a transfer function in order to be sent over the low bitrate interface. An inverse transfer function may also be sent along with the LDR image. Once the LDR image has been sent over the low bitrate interface, the LDR image may be converted to a reconstructed image using the inverse transfer function.

21 Claims, 9 Drawing Sheets

(56) References Cited

U.S. PATENT DOCUMENTS

| | | | |
|---|---|---|---|
| 6,088,176 A * | 7/2000 | Smith | G01N 25/72 360/25 |
| 6,091,853 A | 7/2000 | Otto | |
| 10,140,832 B2 * | 11/2018 | Stout | G08B 21/0423 |
| 2003/0169518 A1 * | 9/2003 | Irani | G01J 5/0003 359/820 |
| 2008/0089454 A1 * | 4/2008 | Higuchi | H03H 17/0294 375/350 |
| 2012/0243784 A1 | 9/2012 | Fukuhara et al. | |
| 2013/0075371 A1 * | 3/2013 | De Souza | G01N 25/72 219/109 |
| 2013/0321637 A1 * | 12/2013 | Frank | H04N 5/33 348/152 |
| 2014/0015921 A1 * | 1/2014 | Foi | H04N 5/21 348/42 |
| 2014/0022460 A1 * | 1/2014 | Li | G06T 5/009 348/708 |
| 2014/0037206 A1 * | 2/2014 | Newton | H04N 19/597 382/166 |
| 2014/0092012 A1 | 4/2014 | Seshadrinathan et al. | |
| 2014/0168445 A1 | 6/2014 | Högasten et al. | |
| 2014/0217289 A1 * | 8/2014 | Nam | G01J 5/0818 250/339.01 |
| 2014/0354675 A1 * | 12/2014 | Lottes | G06T 5/002 345/591 |
| 2015/0215623 A1 * | 7/2015 | Sanders | G06T 15/50 375/240.08 |
| 2016/0373662 A1 * | 12/2016 | Olsen | G06K 9/0063 |
| 2017/0213436 A1 * | 7/2017 | Stout | G08B 21/0423 |
| 2018/0276469 A1 * | 9/2018 | Richards | G06T 7/33 |
| 2019/0251681 A1 * | 8/2019 | Hogasten | G06T 3/40 |

FOREIGN PATENT DOCUMENTS

| | | |
|---|---|---|
| CN | 102567976 | 7/2012 |
| CN | 102906695 | 1/2013 |
| CN | 103020998 | 4/2013 |
| CN | 103621084 | 3/2014 |
| CN | 103891294 | 6/2014 |
| CN | 104881644 | 9/2015 |
| EP | 2898474 | 7/2015 |
| JP | 2011150401 | 8/2011 |
| WO | WO 2015111467 | 7/2015 |

* cited by examiner ical thermal image that
includes a plurality of pixels wherein each pixel is associ-
ated with a HDR thermal image value, determine a transfer
function that associates at least a portion of the HDR thermal
image values with LDR thermal image values, convert, with
the transfer function, the HDR radiometric thermal image to
a low dynamic range (LDR) radiometric thermal image,
determine an inverse transfer function associated with the
transfer function, and transmit the inverse transfer function
and the LDR radiometric thermal image to a receiving
device.

In yet other embodiments, a receiving device may be
provided. The receiving device may include a receiving
controller and may be associated with the logic device. The
receiving controller may be configured to receive the at least
one inverse transfer function, receive the LDR radiometric
thermal images, convert, with the at least one inverse
transfer function, the LDR radiometric thermal images to
reconstructed thermal images, and create a composite image
from a plurality of reconstructed thermal images.

The scope of the invention is defined by the claims, which
are incorporated into this section by reference. A more
complete understanding of embodiments of the invention
will be afforded to those skilled in the art, as well as a
realization of additional advantages thereof, by a consider-
ation of the following detailed description of one or more
embodiments. Reference will be made to the appended
sheets of drawings that will first be described briefly.

HIGH DYNAMIC RANGE RADIOMETRIC THERMAL VIDEO OVER LOW BITRATE INTERFACE

CROSS-REFERENCE TO RELATED APPLICATIONS

This application is a continuation of International Patent Application No. PCT/US2016/052017 filed Sep. 15, 2016 and entitled "HIGH DYNAMIC RANGE RADIOMETRIC THERMAL VIDEO OVER LOW BITRATE INTERFACE," which is incorporated herein by reference in its entirety.

International Patent Application No. PCT/US2016/052017 filed Sep. 15, 2016 claims priority to and the benefit of U.S. Provisional Patent Application No. 62/220,779 filed Sep. 18, 2015 and entitled "HIGH DYNAMIC RANGE RADIOMETRIC THERMAL VIDEO OVER LOW BITRATE INTERFACE," which is incorporated herein by reference in its entirety.

TECHNICAL FIELD

One or more embodiments of the invention relate generally to imaging devices and more particularly to, for example, transfer of high dynamic range image data over a low bandwidth interface or data connection.

BACKGROUND

In certain instances, high dynamic range images may be transferred from a first component to a second component. In such an instance, there may be bandwidth constraints between the first component and the second component. For example, bandwidth constraints may limit transfer of the high dynamic range imaging data between the first and second component. As a result, there is a need for improved data transfer techniques between the first component and the second component.

SUMMARY

Systems and methods are disclosed herein for providing a high dynamic range radiometric thermal images over a low bitrate interface. In certain embodiments, a method may be provided. The method may include receiving a high dynamic range (HDR) radiometric thermal image that includes a plurality of pixels where each pixel is associated with a HDR thermal image value, determining a transfer function that associates at least a portion of the HDR thermal image values with LDR thermal image values, converting, with the transfer function, the HDR radiometric thermal image to a low dynamic range (LDR) radiometric thermal image, determining an inverse transfer function associated with the transfer function, and transmitting the inverse transfer function and the LDR radiometric thermal image to a receiving device.

In certain other embodiments, a system for performing the method may be disclosed. The system may include at least one infrared detector configured to capture HDR radiometric thermal images and output the captured HDR radiometric thermal images and a logic device configured to receive the HDR radiometric thermal images outputted by the at least one infrared detector and perform the method.

In other embodiments, another system may be provided. The system may include a logic device associated with a camera. The logic device may be configured to receive a

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Techniques and mechanisms are provided in accordance with one or more embodiments to transfer a high dynamic range image over a low bitrate data connection. Certain embodiments may transfer the high dynamic range image between a first device and a second device, between a first component and a second component of a device, or between multiple devices and/or components. The high dynamic range image may be a visual image or a radiometric image and may be transferred over, for example, a Bluetooth, wireless local area network ("WiFi"), Near Field Communications ("NFC"), or other type of wireless or wired data connection. For example, certain embodiments may record high dynamic range radiometric thermal images or video and may transfer such video over a low bitrate interface. The radiometric thermal images or video may be infrared or other thermal images or videos. A transfer function may be created to convert the high dynamic range image into a low dynamic range image for transfer over the data connection. An inverse transfer function may be created to convert the low dynamic range image into a reconstructed image once the image has been transferred.

Low bitrate interfaces typically lack the bandwidth to transfer high dynamic range (HDR) images or videos. This is especially true when the HDR image is a part of a video frame and thus the transfer must be performed in a set period of time. The current techniques and mechanisms allow for the transfer of HDR images or video over a low bitrate interface.

Figure 1:
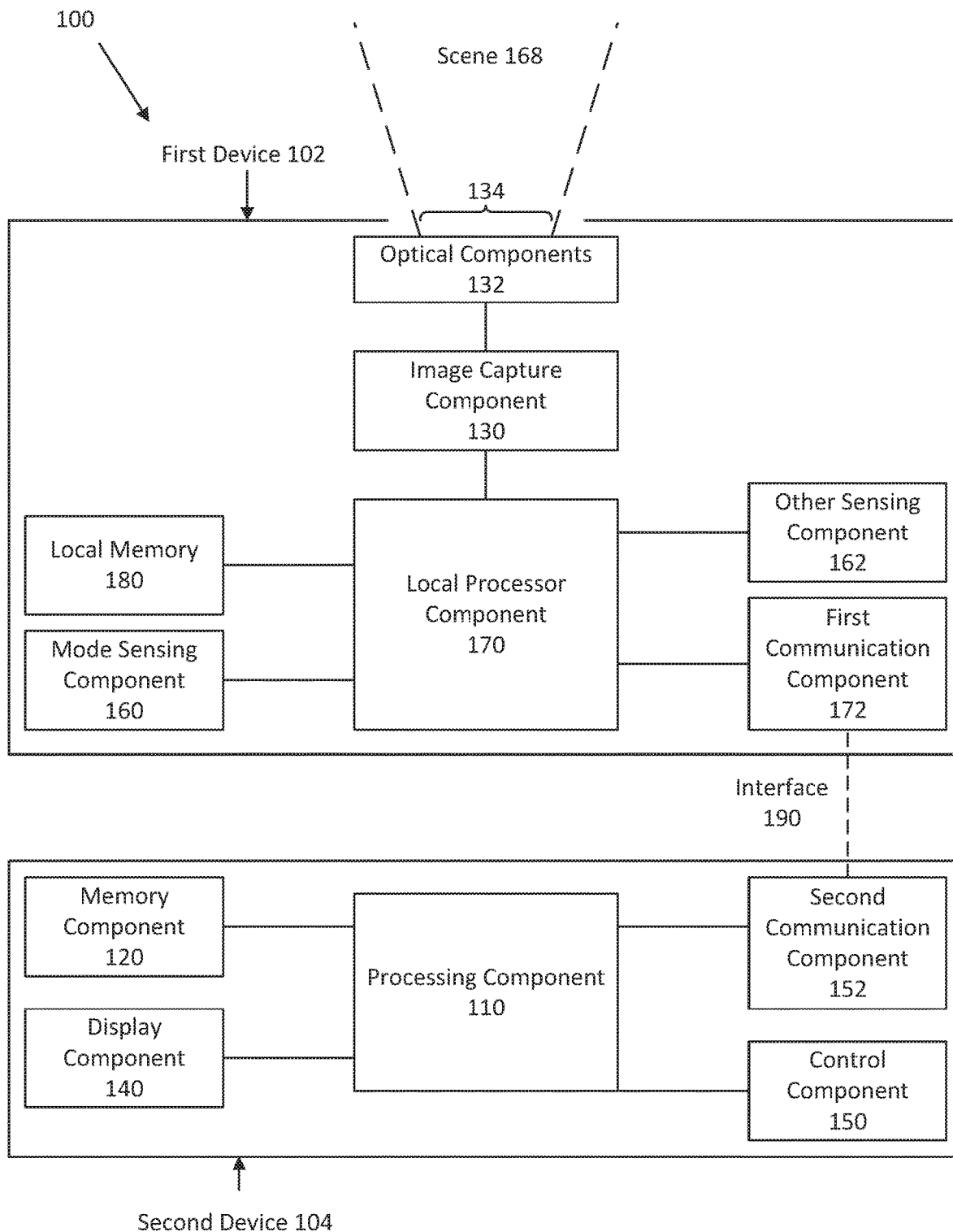
FIG. 1 illustrates a block diagram of an imaging system in accordance with an embodiment of the disclosure.

FIG. 1 illustrates a block diagram of an imaging system in accordance with an embodiment of the disclosure. Imaging system 100 in FIG. 1 may be used to capture and process image frames in accordance with various techniques described herein.

Imaging system 100 includes components distributed over multiple devices. In particular, imaging system 100 includes a first device 102 (a transmitting device) and a second device 104 (a receiving device) in communication with the first device 102. Other embodiments may distribute the components to devices in other ways and may, in addition, distribute the components to three or more devices. Some such embodiments may distribute one, some, or all of the components of imaging system 100 over the cloud. Thus, in those embodiments, image processing may be performed over the cloud, using one or multiple cloud devices, by sending image data over the cloud. Once the image has been processed, the image may be displayed or stored via an internet service (such as on YouTube®, Dropbox®, Google Drive®, etc.) or sent back to a user device and displayed or stored on the user device. In various embodiments, either the first device 102 and/or the second device 104 may be a camera, a camera suite, a sensor suite, a smartphone, a computer, a server, a tablet, or another type of electronic device.

In certain embodiments, the first device 102 and the second device 104 may be coupled together. That is, the first device 102 may be a camera attachment that may be fitted or communicatively connected (e.g., via Bluetooth) to the second device 104. The second device 104 may run an application that performs at least a portion of an image processing procedure. In such an embodiment, the second device 104 may be a smartphone, a tablet, a computer, or another type of electronic device that may receive the camera attachment. In certain embodiments, the camera attachment may be fitted via connectors such as USB or Lightning Cable connectors. Other embodiments may connect the first device 102 and the second device 104 through a network connection, such as via Bluetooth, the internet, Near Field Communications ("NFC"), Local Area Network ("LAN"), or other network connections.

In one embodiment, the first device 102 includes a local processor component 170, a local memory 180, an image capture component 130, optical components 132 (e.g., one or more lenses configured to receive electromagnetic radiation through an aperture 134 in housing 101 and pass the electromagnetic radiation to image capture component 130), a first communication component 172, a mode sensing component 160, and an other sensing component 162. The second device 104 may include a processing component 110, a memory component 120, a display component 140, a second communication component 152, and a control component 150.

In various embodiments, the first device 102 may be implemented as an imaging device, such as a camera, to capture image frames of, for example, a scene 168 (e.g., a field of view). The first device 102 may represent any type of camera which, for example, detects electromagnetic radiation (e.g., irradiance) and provides representative data (e.g., one or more still image frames or video image frames). For example, the first device 102 may represent a camera that is directed to detect one or more ranges (e.g., wavebands) of electromagnetic radiation and provide associated image data. Imaging system 100 may include a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another example, the first device 102 may be integrated as part of a non-mobile installation to provide image frames to be stored and/or displayed.

The local processor component 170 and/or the processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or or any other appropriate combination of processing device and/or memory to execute instructions to perform any of the various operations described herein. The local processor component 170 may be adapted to interface and communicate with components 130, 160, 162, 172, and 180 to perform method and processing steps as described herein. The processing component 110 may be adapted to interface and communicate with components 120, 140, 150, and 152.

Additionally, the local processor component 170 may be adapted to receive image signals from image capture component 130, process image signals (e.g., to provide processed image data), store image signals or image data in local memory 180, and/or retrieve stored image signals from local memory 180. Certain embodiments of the first device 102 may include a plurality of image capture components. Such embodiments may capture multiple scenes and the local processor component 170 and/or the processing component 110 may then create a composite image out of the multiple scenes captured by the plurality of image capture components. The local processor component 170 may also communicate data, via the device communication component 172, to the second device 104. The device communication component 172 may communicate with the second device 104 via an interface 190 established between the device communication component 172 and a communication component 152 of the first device 102. In various embodiments, the interface 190 may be a Bluetooth link, a WiFi link, a NFC link, a wired connection, or another type of link between the first device 102 and the second device 104. In certain embodiments, the interface 190 may be a low bitrate interface. For the purposes of this disclosure, a "low bitrate interface" may be any interface that would not transfer data at a high enough rate to allow smooth real-time showing or streaming on a receiving device. Accordingly, as video definitions increase, the speed of what is considered a "low bitrate interface" may increase as well. Additionally, certain such interfaces may be limited in the amount of dynamic range that the interfaces can transfer due to the interfaces themselves or software used to process videos. For example, certain commercially available video encoders, video compressors, and display drivers may require frames to have only 8 or 10 bits of dynamic range (for example, 8 bits of luminance dynamic range). As the software used to process the videos are part of the process of transferring the video data, such software may also be considered as part of the "low bitrate interface". Certain hardware components such as the physical interfaces may also be limited to a maximum number of bits per sample. For example, parallel data interfaces may only have 8 pins on a connector of there may be 10 input pins on a serializer (parallel to serial converter).

In other embodiments, the interface 190 may have available bandwidth that may allow the first device 102 to communicate images or video to the second device 104 in high dynamic range. However, in such embodiments, low bitrate communication may still be desirable as transferring via low bitrate may allow additional devices to share the interface 190.

The local memory 180 and/or the memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 and/or the local processor component 170 is adapted to execute software stored in the memory component 120 and/or the local memory 180, respectively, to perform various methods, processes, and modes of operations in manner as described herein.

Image capture component 130 includes, in one embodiment, one or more sensors (e.g., any type visible light, infrared, or other type of detector, including a detector implemented as part of a focal plane array) for capturing image signals representative of an image, of scene 168. In one embodiment, the sensors of image capture component 130 (e.g., an infrared sensor) provide for representing (e.g., converting) a captured thermal or radiometric image signal of scene 168 as digital data (e.g., via an analog-to-digital converter included as part of the sensor or separate from the sensor as part of imaging system 100). The image capture component 130 may capture high dynamic range radiometric thermal images or videos.

The local processor component 170 or the processing component 110 (via the interface 190) may be adapted to receive image signals from the image capture component 130, process image signals (e.g., to provide processed image data), store image signals or image data in the local memory 180 or the memory component 120, and/or retrieve stored image signals from the respective memories. Image data, either high dynamic range image data or low dynamic range image data, may be transferred between the first device 102 and the second device 104 between the interface 190. In certain embodiments, the image data transferred may be compressed image data. Processing component 110 may be adapted to process image signals received to provide image data (e.g., reconstructed image data) to the display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140 that the processing component 110 retrieved from the memory component 120, processed from image data received via the interface 190, or processed from any other source. Display component 140 may include display electronics, which may be utilized by processing component 110 to display image data and information. Display component 140 may receive image data and information directly from image capture component 130 via the interface 190, from the local processor component 170 via the interface 190, or the image data and information may be transferred from memory component 120.

In various aspects, display component 140 may be remotely positioned (e.g., housed in a separate housing) from the image capture component 130, and processing component 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, it should be appreciated that the control panel unit may be adapted to include one or more other user-activated mechanisms to provide various other control operations of imaging system 100, such as auto-focus, menu enable and selection, field of view (FoV), brightness, contrast, gain, offset, spatial, temporal, and/or various other features and/or parameters. In other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

In certain embodiments, the first device 102 may include the control component 150 and/or the display component 140 instead of or in addition to the second device 104. It is appreciated that the various components described herein may be included on either or both of the first device 102 and the second device 104.

Mode sensing component 160 includes, in one embodiment, an application sensor adapted to automatically sense a mode of operation, depending on the sensed application (e.g., intended use or implementation), and provide related information to the local processor component 170 and/or the processing component 110. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electro-mechanical triggering mechanism, an electro-magnetic triggering mechanism, or some combination thereof. For example for one or more embodiments, mode sensing component 160 senses a mode of operation corresponding to the imaging system 100's intended application based on the type of mount (e.g., accessory or fixture) to which a user has coupled the imaging system 100 (e.g., image capture component 130). Alternatively, the mode of operation may be provided via control component 150 by a user of imaging system 100 (e.g., wirelessly via display component 140 having a touch screen or other user input representing control component 150).

Furthermore, in accordance with one or more embodiments, a default mode of operation may be provided, such as for example when mode sensing component 160 does not sense a particular mode of operation (e.g., no mount sensed or user selection provided). For example, imaging system 100 may be used in a freeform mode (e.g., handheld with no mount) and the default mode of operation may be set to handheld operation, with the image frames provided wirelessly to a wireless display (e.g., another handheld device with a display, such as a smart phone, or to a vehicle's display).

Mode sensing component 160, in one embodiment, may include a mechanical locking mechanism adapted to secure the imaging system 100 to a vehicle or part thereof and may include a sensor adapted to provide a sensing signal to processing component 110 when the imaging system 100 is mounted and/or secured to the vehicle. Mode sensing component 160, in one embodiment, may be adapted to receive an electrical signal and/or sense an electrical connection type and/or mechanical mount type and provide a sensing signal to processing component 110. Alternatively or in addition, as discussed herein for one or more embodiments, a user may provide a user input via control component 150 (e.g., a wireless touch screen of display component 140) to designate the desired mode (e.g., application) of imaging system 100.

Processing component 110 and/or local processor component 110 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of imaging system 100). In certain embodiments, a component may communicate with another component via the interface 190.

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). In one embodiment, mode sensing component 160 may include communication devices that relay information to processing component 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging system 100 may include one or more other types of sensing components 162, including environmental and/or operational sensors, depending on the sensed application or implementation, which provide information to processing component 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 162 may include one or more conventional sensors as would be known by those skilled in the art for monitoring various conditions (e.g., environmental conditions) that may have an effect (e.g., on the image appearance) on the data provided by image capture component 130. The other sensing components 162 may be located on the first device 102, as shown in FIG. 1, on the second device 104, on both the first device 102 and the second device 104, or, alternatively or additionally, on another device separate from the first device 102 and the second device 104.

In some embodiments, other sensing components 162 may include devices that relay information to processing component 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of imaging system 100 may be combined and/or implemented or not, as desired or depending on application requirements, with imaging system 100 representing various operational blocks of a system. For example, processing component 110 may be combined with memory component 120, image capture component 130, display component 140, and/or mode sensing component 160. In another example, processing component 110 may be combined with image capture component 130 with only certain operations of processing component 110 performed by circuitry (e.g., a processor, a microprocessor, a microcontroller, a logic device, or other circuitry) within image capture component 130. In still another example, control component 150 may be combined with one or more other components or be remotely connected to at least one other component, such as processing component 110, via a wired or wireless control device so as to provide control signals thereto.

In one embodiment, communication component 152 and/or device communication component 172 may be implemented as a network interface component (NIC) adapted for communication with a network including other devices in the network. In various embodiments, communication component 152 and/or device communication component 172 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 and/or device communication component 172 may include an antenna coupled thereto for wireless communication purposes. In other embodiments, the communication component 152 and/or device communication component 172 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network. The communication component 172 communication component 152 may send radiometric thermal images or video over the interface 190 to the communication component 152.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100 may be associated with a particular network link such as for example a URL (Uniform Resource Locator), an IP (Internet Protocol) address, and/or a mobile phone number.

Figure 2:
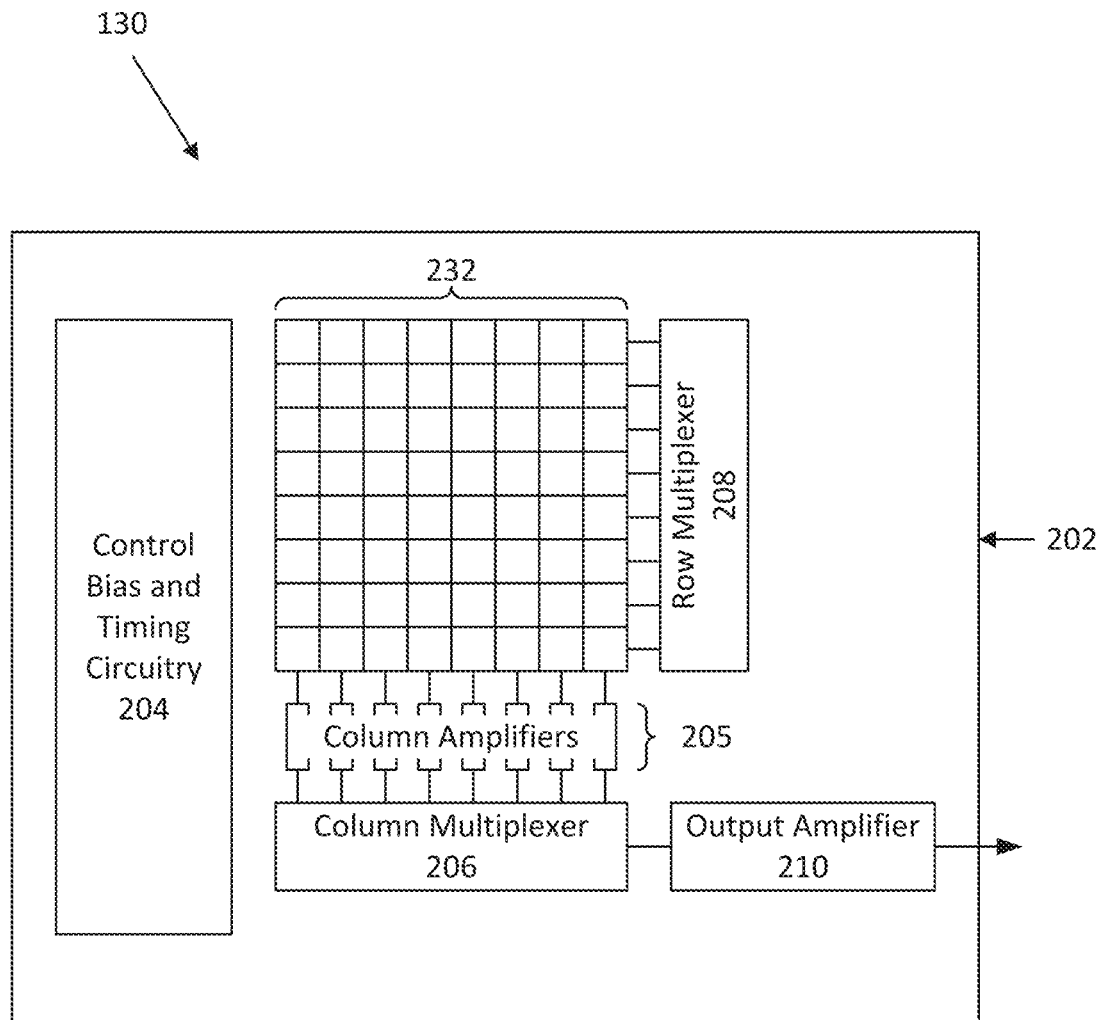
FIG. 2 illustrates a block diagram of an example image capture component in accordance with an embodiment of the disclosure.

FIG. 2 illustrates a block diagram of example image capture component 130 in accordance with an embodiment of the disclosure. In this illustrated embodiment, image capture component 130 is a focal plane array (FPA) including an array of unit cells 232 and a read out integrated circuit (ROIC) 202. Each unit cell 232 may be provided with an infrared detector (e.g., a microbolometer or other appropriate sensor) and associated circuitry to provide image data for a pixel of a captured thermal image frame. In this regard, time-multiplexed electrical signals may be provided by the unit cells 232 to ROIC 202.

ROIC 202 includes bias generation and timing control circuitry 204, column amplifiers 205, a column multiplexer 206, a row multiplexer 208, and an output amplifier 210. Image frames captured by infrared sensors of the unit cells 232 may be provided by output amplifier 210 to processing component 110 and/or any other appropriate components to perform various processing techniques described herein. Although an 8 by 8 array is shown in FIG. 2, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Figure 3:
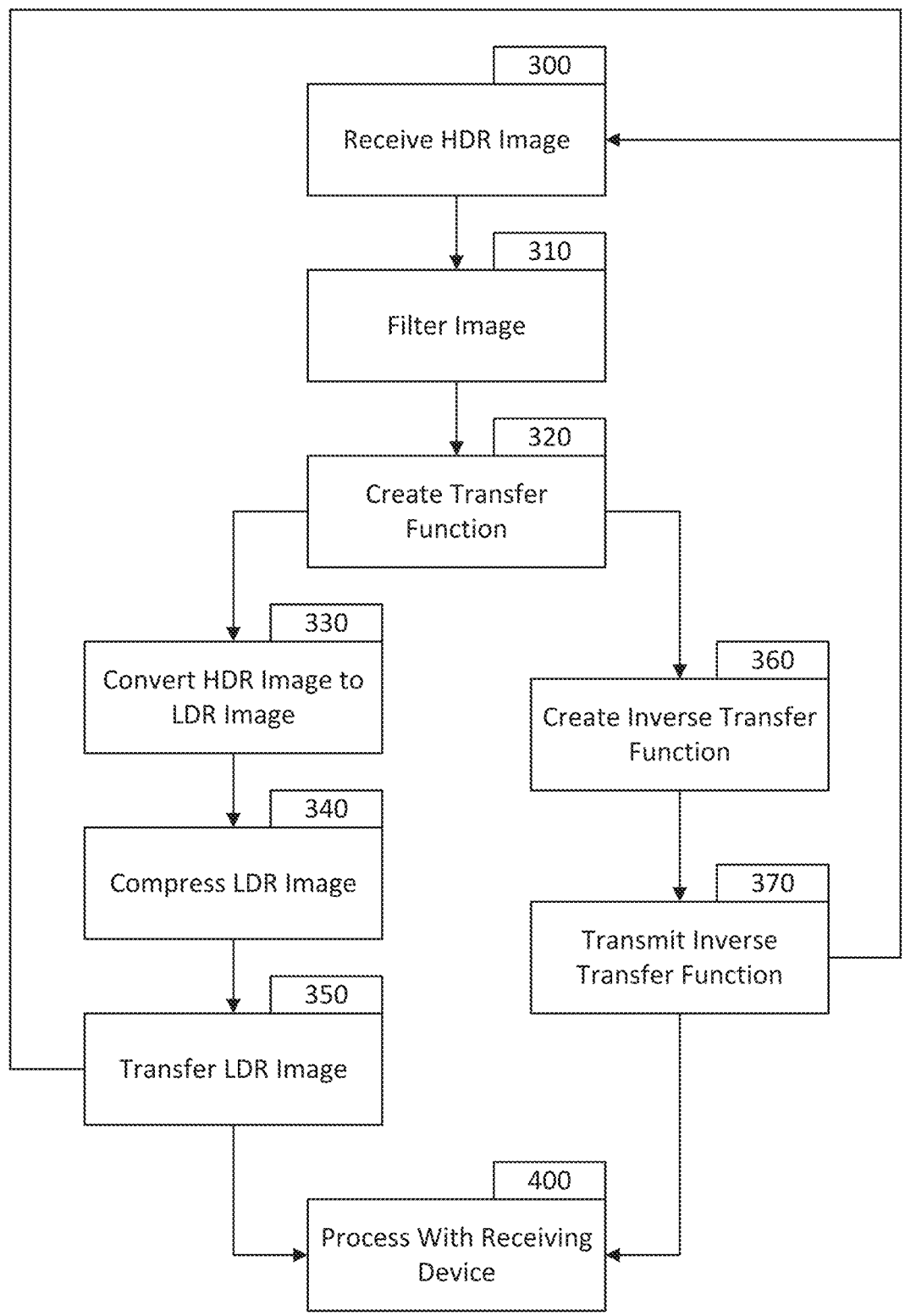
FIG. 3 illustrates a flowchart of a process of transferring a high dynamic range image over a low bitrate data connection in accordance with an embodiment of the disclosure.

FIG. 3 illustrates a flowchart of a process of transferring a high dynamic range image over a low bitrate data connection in accordance with an embodiment of the disclosure. The process described in FIG. 3 may begin at block 300. In block 300, a device may receive a high dynamic range (HDR) image. The HDR image may be received from an image capture component, such as the image capture component 130 by, for example, the image capture component 130 capturing a scene and outputting the image of the scene as HDR image data and may include a plurality of pixels depicting the scene. The HDR image may be received by a controller, such as the local processor component 170. Certain embodiments may receive multiple HDR images from multiple image capture components. In such embodiments, multiple HDR to LDR image conversions may be performed by the local processor component 170.

In certain embodiments the HDR image may be a radiometric image (e.g., an image measuring electromagnetic radiation, such as a thermal image) though HDR images of other embodiments may be visual images. For thermal HDR images, the image value or pixel value of a pixel within the HDR image may reflect a temperature of a portion of the scene represented by the pixel. In such an embodiment, pixels imaging warmer portions of the scene may have higher signal values while pixels imaging cooler portions of the image may have lower signal values. Additionally, the HDR image received in block 300 may be a still image or a frame of a video.

The HDR image may, in certain embodiments, be an image with a high amount of dynamic range. For example, the HDR image may include 8 bits, 12, bits, 14 bits, 16 bits, 18 bits, 24 bits, or higher than 24 bits of range. It is appreciated that while the HDR image may have a certain amount of available dynamic range, image signals may utilize only a portion of the available dynamic range.

After the image has been received in block 300, the image received in block 300 may be filtered in block 310. In block 310, a filter may be applied to the image to remove noise, preserve or enhance edges within the image, or filter the image in another way. The filtering of the image may be varied depending on the position of the image. That is, certain portions of the image (such as the center, the edges, or a position of interest such as a heat source) may be filtered differently (for example, with a different set of filter parameters) than other portions of the image. In certain embodiments, the image filtering step of block 310 may be skipped or forgone. In embodiments where multiple images are received, filtering may be performed on one, some, or all of the images received.

In block 320, a transfer function may be created. The transfer function may map or associate each HDR image value to a low dynamic range (LDR) image value. The LDR image may be an image with a dynamic range lower than the HDR image. That is, if a certain embodiment has an HDR image with a dynamic range of 16 bits, the LDR image may be an image with a dynamic range of 12 bits, 8 bits, 6 bits, 5 bit, 4 bits, or any other dynamic range less than 16 bits. If the HDR image has a higher dynamic range, the LDR image may accordingly also have a higher dynamic range, though the LDR image's dynamic range may still be lower than the HDR image's dynamic range.

As the HDR image has a higher dynamic range than the LDR image, in certain instances, signals present in the HDR image may utilize a higher amount of image values than the total amount of image values available for the LDR image. For example, a 12 bit image may include 4,096 unique signal values (e.g., pixel values) while an 8 bit image can include only 256 unique signal values. As such, the HDR image may utilize more than 256 image values and, thus, in an LDR representation of the original HDR image, multiple unique HDR values will be represented by the same, single, LDR image value. In some such applications, representing multiple HDR values with a single LDR image value may lead to an undesirable loss of information.

The transfer function may map or associate the HDR image values to the LDR image values through various algorithms. For example, in a certain embodiment, the amount of unique HDR image values used in the HDR image may first be determined. If the number of LDR image values available is higher than the amount of unique HDR image values used in the HDR image, then the transfer function may map each unique HDR image value used in the HDR image to a unique LDR image value in a piecewise linear function. In certain such embodiments, the transfer function may map the HDR image values to a set sequence of LDR image values (e.g., if there are 60 unique HDR image values, it may map the unique HDR image values to pixel values of 120 to 180 for a 8 bit LDR image), but other embodiments may first determine the relative relationships between the unique HDR image values and try to preserve such relative relationships, when possible, when mapping the HDR image values to corresponding LDR image values (e.g., if an HDR image uses image values at two tail ends of a distribution of possible HDR image values, the corresponding LDR image values used may also be distributed at the tail ends of the possible image value distribution). In such instances, the piecewise linear function may be a one-to-one function. Additionally, a non-linear, monotonically increasing, transfer function may be used such that the lowest LDR image value used is the lowest possible LDR image value and the highest LDR image value used is the highest possible LDR image value. One possible method to create such a HDR to LDR transfer function is histogram equalization.

In other embodiments, differences between image values may be maximized to better show temperature differences or image contrast of within the image. In such embodiments, the transfer function may be created such that the full range of possible LDR image values are used (e.g., at least one LDR pixel has an image value of the lowest possible value and at least one LDR pixel has an image value of the highest possible value).

The HDR image values may also be associated to LDR image values through other techniques. Another example may be applicable for situations where the amount of unique HDR image values may exceed the amount of available LDR image values. In such a situation, the previous example of one-to-one linear piecewise mapping of HDR image values to LDR image values may not be possible. As such, the HDR image values of the HDR image may be mapped to the LDR image values through, for example, a linear compression or histogram equalization where HDR image values of increasing value are mapped to increasing LDR image values.

In one example, the HDR image values may be associated to LDR image values on a linear basis. That is, the mapping of HDR to LDR image values may be linear. In other words, if there are 256 available LDR image values and there are 512 unique HDR image values, two HDR image values may be matched to one LDR image value. In such an example, the two lowest HDR image values may be matched to the lowest LDR image value, the next two lowest HDR image values may be matched to the next lowest LDR image value, and so on. In certain such examples, the number of HDR image values may not exactly match up with the number of LDR image values (e.g., there may be 2.5 unique HDR image values for every available LDR image value). For those examples, there may be alternating sequences where one LDR image value is assigned an additional HDR image value. Associating HDR image values to LDR image values on a linear basis may be further described in FIG. 7A.

Another technique of mapping HDR image values to LDR image values may be histogram equalization. In such a technique, the slope of the HDR to LDR transfer function may be proportional to the amplitude of the histogram for the corresponding HDR image value. Histogram equalization of HDR image values to LDR image values may be illustrated in further detail in FIG. 7C.

Also, the mapping of HDR image values to LDR image values may be fully or partially governed by other logic. For example, the LDR image value gain may be limited such that an increase of one count of the HDR image value may correspond to no more than an increase of one count of the LDR image value. Other embodiments may limit the maximum slope of the transfer to other values different from one depending on, for example, the maximum needed signal fidelity on the receiving side.

The mapping of HDR image values to LDR image values may be performed according to a HDR to LDR compression. The HDR to LDR compression may determine the number of HDR counts associated with each LDR count. Accordingly, the lower the HDR to LDR compression, the lower the amount of HDR values associated with each LDR count. In some images, the transfer function may map all HDR image values of the image to LDR image values according to a single HDR to LDR compression. In other images, the HDR to LDR compression may be different for different ranges of HDR image values. Other images may associate different HDR to LDR compression for each LDR image value. In certain embodiments, a center and/or point of interest within the image may be detected and image values within the range of the image values in the center and/or the point of interest may have a lower HDR to LDR compression. Accordingly, each count of LDR gain may correspond to a smaller amount of HDR gain within the center and/or the point of view than elsewhere within the image (e.g., within the center of the image, a smaller amount of HDR image values may be mapped to each LDR image value).

In certain such embodiments, the center of the image may be determined to be a point of interest, as images are sometimes centered on the point of interest. In other embodiments, a point of interest or multiple points of interest may be detected within the image. In certain such embodiments, the point of interest may be detected thermal values that are close to values typical for human temperature and/or irradiance levels. Additionally, the thermal values that are close to the values typical for human temperature and/or irradiance levels may have a lower HDR to LDR compression. Points of interest are further illustrated in FIG. 5.

In one embodiment, the transfer function may be created as a scaled cumulative sum of vector values. Each vector index represents an HDR image value or a continuous range of HDR image values. The value/amplitude at each vector index is the sum of some metric, for all pixels of a specific HDR value or range of values. If the metric is a simple existence metric, i.e. metric is always '1', the vector becomes a histogram of pixel intensities. In an application where a user defines a set of interest points, the metric could be inversely proportional to the Euclidian distance from nearest interest points such that vector indices representing HDR values that are common near the points of interest will have higher values/amplitude than vector indices representing values that are not common near the points of interest. Additionally, the point of interest can be defined in the irradiance space instead of in the image space. For example, the point of interest could be defined as a specific HDR value range understood to be close to values common when imaging human subjects. The metric can be inversely proportional to the difference in signal value relative to the point of interest (e.g., signal value of interest). Other metrics can be used to determine the vector values as can be understood by someone skilled in the art.

In some embodiments, including embodiments where each image may be a frame of a video, a transfer function may be created for each image processed. In other embodiments, a transfer function may be created only once, only created after a certain amount of frames (e.g., less than 5, less than 10, less than 20, less than 50, or 50 or more) has been processed, or a change within the image has been detected (e.g., when movement is detected for a point of interest or when the irradiance level of a point of interest has noticeably change from one image to another). In such embodiments, a previously created transfer function, such as the last newly created transfer function, may be used to convert HDR images to LDR images for image frames processed without creating a new transfer function. As such, during processes when a new transfer function is not created, the process may transition from block 310 to block 330 and/or block 360.

In embodiments where the multiple HDR images are received in block 300, multiple transfer functions may be created. Certain such embodiments may create a transfer function for each HDR image, but other embodiments may share transfer functions between the images. In such embodiments, a plurality of HDR images may share a transfer function and conversion of some or all HDR images to LDR images may be performed utilizing the shared transfer function.

After the transfer function has been created in block 320, the process may then split into a plurality of branches. The branches may include an image conversion branch and an inverse transfer function branch.

The image conversion branch may include blocks 330-350. Embodiments that receive multiple HDR images may perform the image conversion branch of blocks 330-350, as well as the inverse transfer function branch of blocks 360-370, if applicable, for each HDR image received. In block 330, the HDR image may be converted to a LDR image. The HDR image may be converted to the LDR image through the transfer function created in block 320. As such, the pixels within the HDR image may be converted from a HDR image value to a LDR image value through the transfer function.

In block 340, after the HDR image has been converted to the LDR image, the LDR image may be compressed in block 340. Compression of the LDR image may be performed through any suitable video compression technique. Certain commercially available video encoders or video compressors may require frames to have a limited dynamic range, such as only 6, 8, 10, or 12 bits of dynamic range. If video compression is performed with such software, the HDR image may thus first need to be converted to an LDR image before compression of the image may be performed.

After the LDR image has been compressed in block 340, the compressed LDR image may be communicated between devices in block 350. For example, the compressed LDR image may be communicated from the first device 102 to the second device 104 through the interface 190. The interface 190 may be a low bitrate interface, such as a Bluetooth, WiFi, NFC, or other wired or wireless interface. For the purposes of this disclosure, the device transmitting the LDR image (and the inverse transfer function, in block 370) may be referred to as a transmitting device. The device receiving the LDR image and the inverse transfer function may be referred to as a receiving device. Additionally, any metadata associated with the image or video may also be transferred in block 350 (or block 370 detailed herein). The metadata may aid in the processing, displaying, or construction of the image or video.

The inverse transfer function branch of the technique may include blocks 360-370. In block 360, an inverse transfer function may be created. The inverse transfer function may be a function that converts LDR image values back to HDR image values. Thus, the inverse transfer function may be the inverse, or may closely approximate the inverse, of the transfer function created in block 320. For example, in an embodiment where the HDR image is a 14 bit image and the LDR image is an 8 bit image, if the transfer function created in block 320 maps HDR image values 345-355 to LDR image value 29, the inverse transfer function may map a LDR image value of 29 to an HDR image value of any within the range of 345-355.

In certain embodiments, as a LDR image value may be associated with a range of possible HDR image values, the inverse transfer function may additionally include steps to determine which of the possible HDR image values a pixel may be. Such steps may include determining, based on the location of the pixel, which of the possible HDR image values the pixel may be. The location of the pixel may be the absolute location (e.g., whether the pixel is in the center or along the side of the image) or a relative location (e.g., how close the pixel is to other pixels of different HDR image values and/or whether the pixel is along a detected edge, and/or other considerations). For example, pixels close to a neighboring pixel with a lower HDR image value may be assigned a HDR image value near the bottom of possible HDR image values, while pixels close to a neighboring pixel with a higher HDR image value may be assigned a HDR image value near the top of a range of possible HDR image values.

In some embodiments, including embodiments where each image may be a frame of a video, an inverse transfer function may be created for each image processed. In other embodiments, an inverse transfer function may be created only once, only periodically, or only when changes have been detected within the image from frame to frame. The inverse transfer function creation frequency may mirror the frequency used in determining when to create the transfer function or it may be independent of the frequency of creation of the transfer function.

After the inverse transfer function has been created in block 360, the inverse transfer function may be communicated between devices in block 370. For example, the inverse transfer function may be communicated from the first device 102 to the second device 104. Once the transmitting device has communicated the LDR image and the inverse transfer function to the receiving device, the transmitting device may return to block 300 and receive another HDR image to process, if there are any additional HDR images. In certain examples, the imaging system utilizing the process disclosed herein may be recording, processing, transmitting, and/or displaying video. In such an example, the imaging system may process a HDR image frame and, after transferring the LDR image frame associated with the HDR image frame and the inverse transfer function, proceed to process a next frame within the video. In certain such examples, there may be logic that limits the amount of time spent processing each frame so that a smooth frame rate can be maintained. In instances when a new inverse transfer function is not created, block 370 may be omitted.

The LDR image and the inverse transfer function may be received by a receiving device, such as the second device 104, in block 400. The receiving device may then process the LDR image with the inverse transfer function. The processing of the LDR image with the inverse transfer function may be further detailed in FIG. 4.

Figure 4:
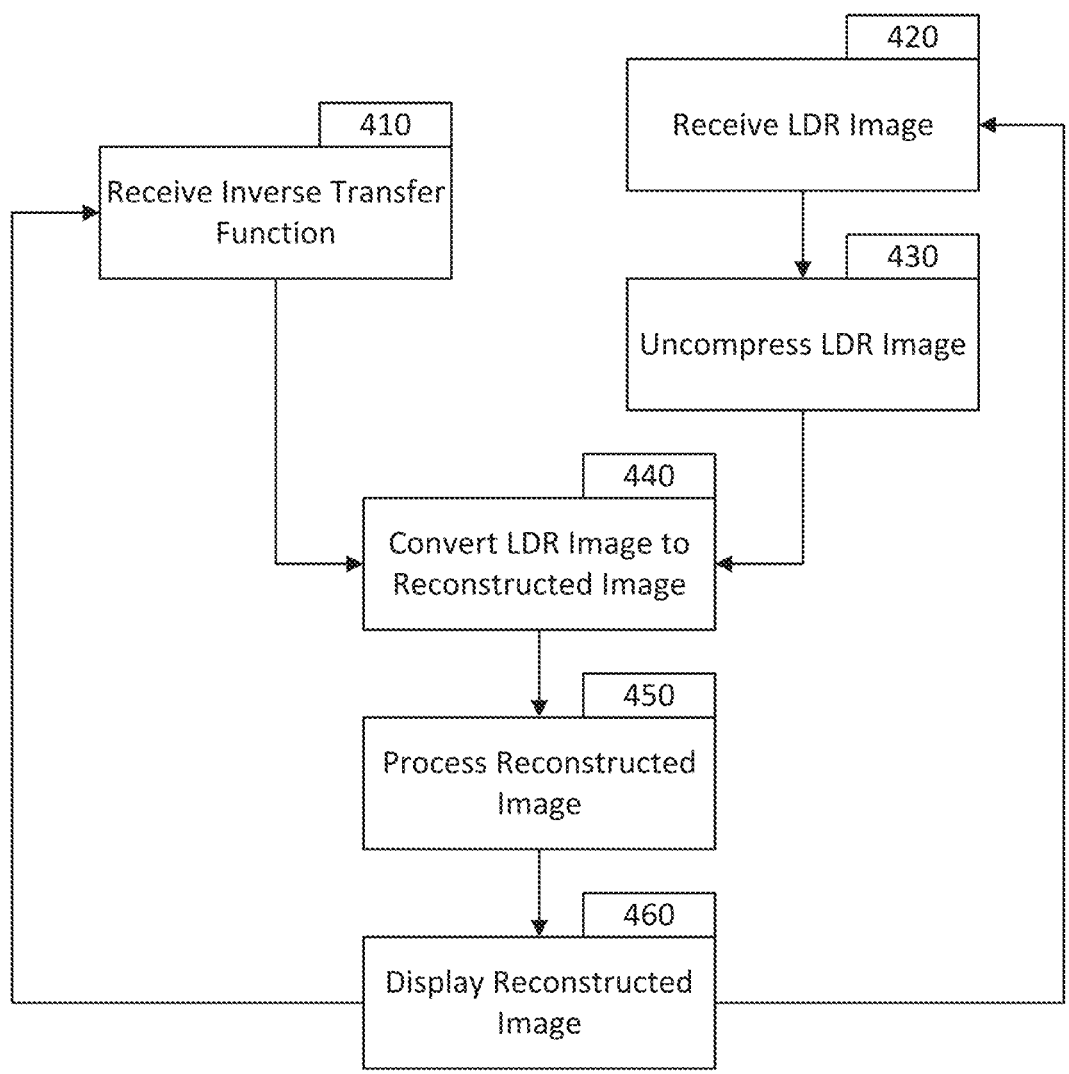
FIG. 4 illustrates a flowchart of a process of reconstructing a low dynamic range image received over a low bitrate data connection into a high dynamic range image in accordance with an embodiment of the disclosure.

FIG. 4 illustrates a flowchart of a process of reconstructing a low dynamic range image received over a low bitrate data connection into a high dynamic range image in accordance with an embodiment of the disclosure. In blocks 410 and 420 of FIG. 4, the receiving device may receive the LDR image and the inverse transfer function communicated from the transmitting device (in blocks 350 and 370 of FIG. 3). Certain embodiments may not receive an inverse transfer function with every LDR image. In such an embodiment, the LDR image may be processed with a previously received inverse transfer function, such as the last inverse transfer function received by the receiving device.

After the LDR image has been received in block 420, it may be uncompressed in block 430. The LDR image may be uncompressed through any suitable video uncompression technique.

In block 440, the uncompressed LDR image may be processed with the inverse transfer function to create a reconstructed image. The reconstructed image may be created by, for example, converting the LDR image to a HDR image by converting the LDR image values to corresponding HDR image values. The LDR image values may be converted to HDR image values by, for example, using the inverse transfer function created in block 360 of FIG. 3.

After the LDR image has been processed in block 440 and recreated into a reconstruction image, the reconstructed image may be further processed in block 450. The reconstructed image may be further processed by, for example, sharpening of edges within the image or through histogram equalization. Other processing may also be performed in block 450. Additionally, in embodiments with multiple image capture components that output multiple HDR images, the multiple HDR images that have been processed into LDR images and reconstructed images may then be combined together in block 450 to create one or more composite images. Also, certain embodiments may not additionally process the reconstructed image and thus, those embodiments may skip block 450.

In block 460, the reconstructed image may be displayed. The reconstructed image may be displayed on, for example, the display component 140 of FIG. 1. While the reconstructed image may be displayed on the receiving device, certain embodiments may first communicate the reconstructed image to another device before it is displayed.

After the LDR image has been processed to a reconstructed image, a new LDR image (such as a next frame in a video) may be received in block 420, a new inverse transfer function may be received in block 410, and the new LDR image may then be processed. In certain embodiments, a new inverse transfer function may only be periodically received instead of being received with every LDR image. Additionally, the new LDR image and/or the new inverse transfer function may be received after the LDR image has been converted to a reconstructed image in block 440, after the reconstructed image has been additionally processed in block 450, or after the reconstructed image has been displayed in block 460.

Figure 5:
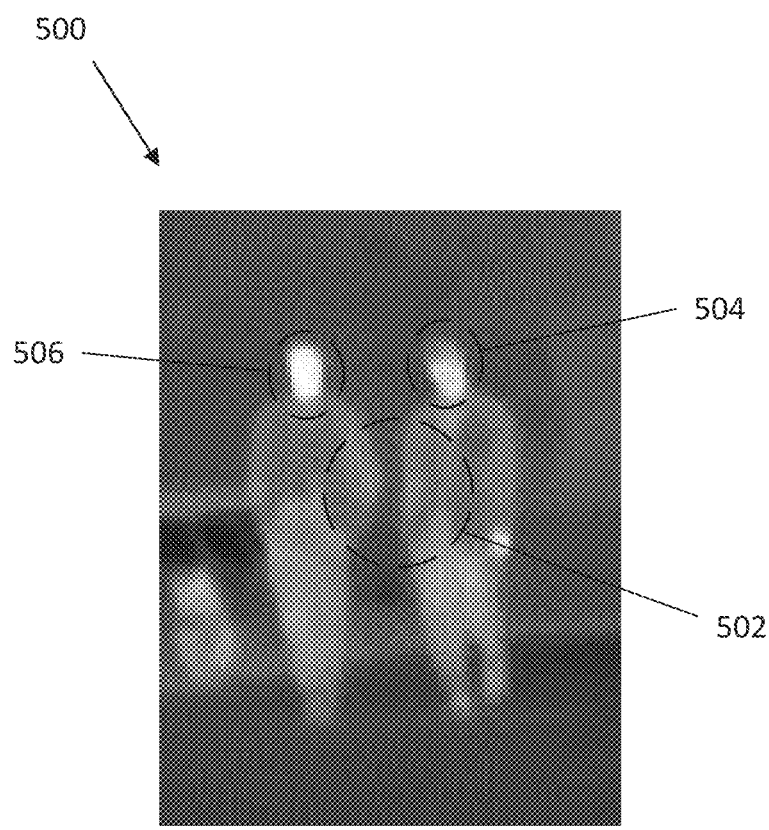
FIG. 5 illustrates a radiometric image in accordance with an embodiment of the disclosure.

FIG. 5 illustrates a radiometric image in accordance with an embodiment of the disclosure. Image 500 in FIG. 5 may be a radiometric image depicting thermal readings of a scene. Image 500 shows a radiometric image of two people walking. In image 500, higher temperatures detected within the scene may correspond to pixels with brighter (e.g., whiter) pixel values while cooler temperatures may correspond to pixels with darker pixel values.

Within image 500, there is an image center 502. In certain embodiments, the HDR to LDR compression may be lower for values of pixels within the image center 502. Also, image 500 also includes two image hotspots, hotspot 504 and hotspot 506. Certain embodiments may detect hotspots with images, such as hotspots 504 and 506 within the image 500 and allow for lower HDR to LDR compression for values of pixels within the detected hotspots.

Additionally, pixels with pixel values that correspond relatively closely to human irradiance levels may also include lower HDR to LDR compression in some embodiments. For example, a certain such embodiment may allow for lower HDR to LDR compression when a pixel with a pixel value that is roughly within 5 degrees Celsius of typical human irradiance levels is detected. In FIG. 5, such pixels may also include the pixels within the hotspots 504 and 506, as the hotspots 504 and 506 include pixels depicting the temperature of bare skin of two humans.

Figure 6:
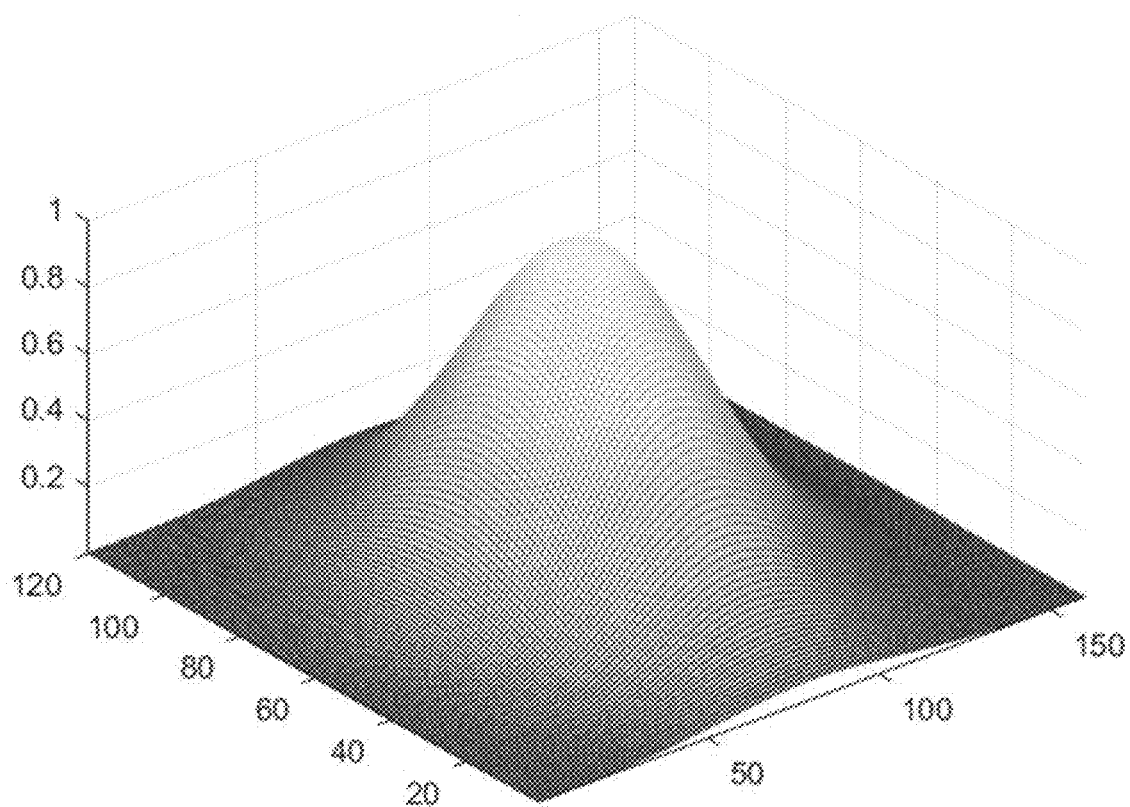
FIG. 6 illustrates a high dynamic range to low dynamic range transfer function in accordance with an embodiment of the disclosure.

FIG. 6 illustrates, a high dynamic range to low dynamic range transfer function in accordance with an embodiment of the disclosure. In FIG. 6, the z-axis depicts a HDR to LDR gain. A gain value of 1 may correlate to a one-to-one transfer between HDR and LDR values. The other two axes represent pixel position.

In FIG. 6, a weighting function is depicted. This weighting function may be used when calculating the metrics for each value or range of values of the vector/histogram. Using this weighting function will increase the value for the vector indices associated with values common in the center region of the image. If the transfer function slope/gain is proportional to this calculated weighted sum, objects near the center of the image may have less dynamic range compression and the reconstructed image may more closely reconstruct the HDR value to that of the original HDR value for this region.

Figure 7A:
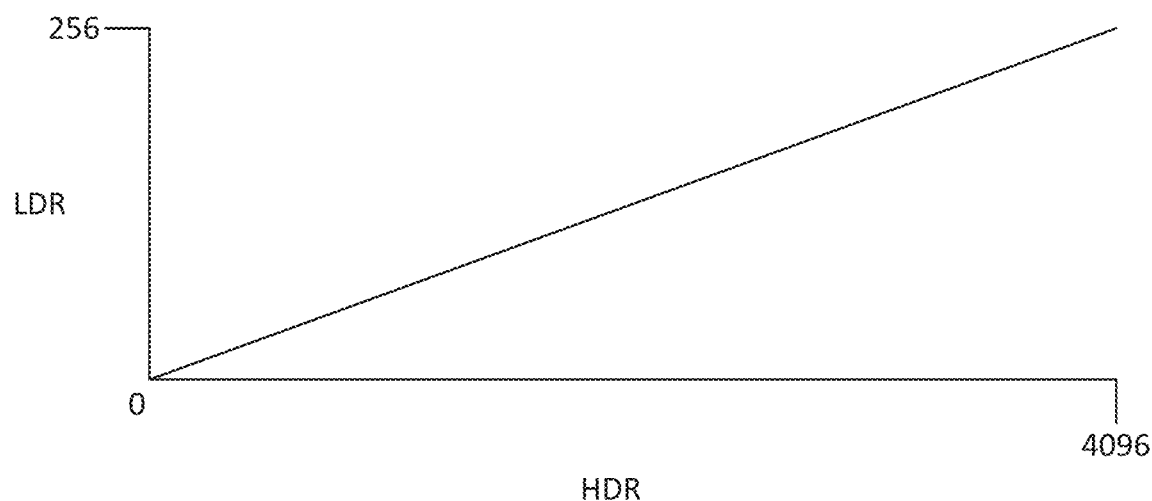
FIGS. 7A-C illustrate additional high dynamic range to low dynamic range transfer functions in accordance with an embodiment of the disclosure.
Figure 7B:
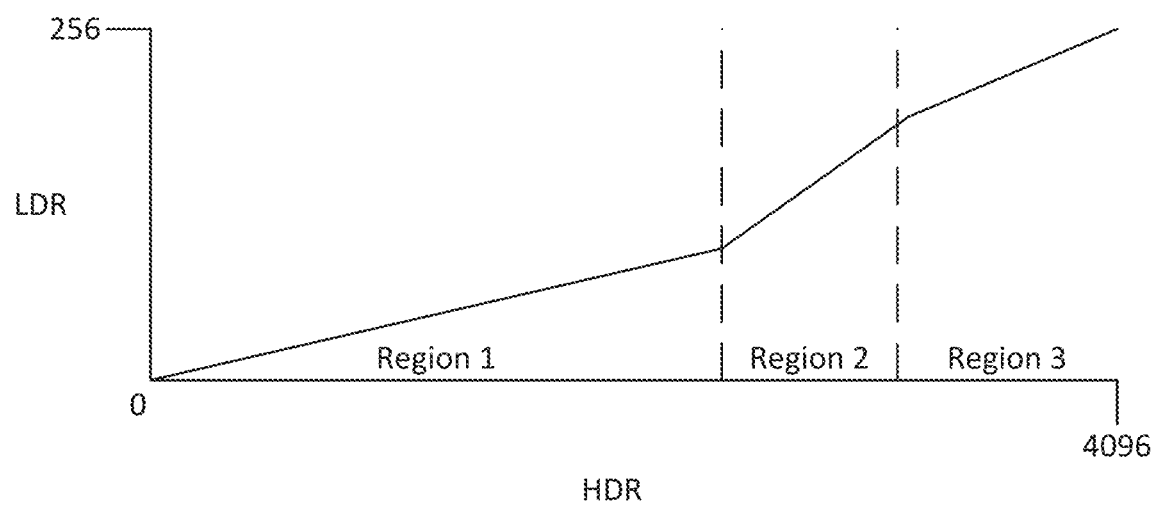
Figure 7C:
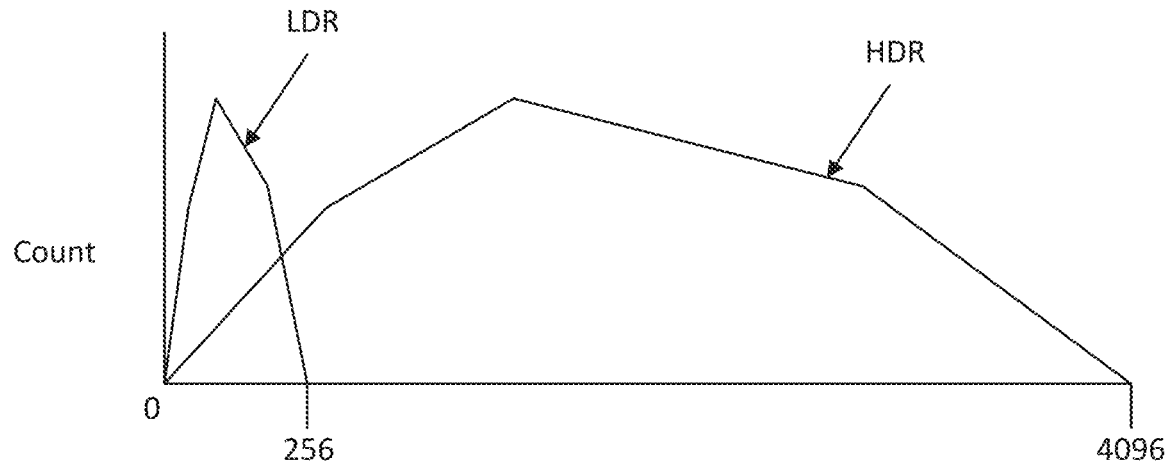

FIGS. 7A-C illustrate additional high dynamic range to low dynamic range transfer functions in accordance with an embodiment of the disclosure. FIG. 7A illustrates a linear transfer function. FIG. 7B illustrates a transfer function with varying HDR to LDR gain/compression. It is appreciated that HDR to LDR gain may be inverse in relationship to HDR to LDR compression. That is, a lower HDR to LDR compression may denote a higher HDR to LDR gain. FIG. 7C illustrates a transfer function based on histogram equalization. The HDR image of FIGS. 7A-C may be a 12 bit image with 4,096 possible image values. The LDR image of FIGS. 7A-C may be an 8 bit image with 256 image values. Note that, while FIGS. 7A-C illustrates a transfer function that may map image values of all possible image values within the HDR and LDR images, other embodiments may map only a portion of the possible image values of the HDR and/or LDR images. It is appreciated that while the gain depicted in FIGS. 7A-C may be shown to be continuous, the gain may actually be piecewise constant. Due to the resolution of FIGS. 7A-C, such piecewise constant gain may be presented by a continuous slope, rather than as individual steps.

In FIGS. 7A and 7B, the x-axis represents HDR image values of an HDR image while the y-axis represents LDR image values of a corresponding LDR version of the HDR image. In FIG. 7A, the HDR to LDR gain is linear across the entire pixel range. That is, the lowest LDR image value may map to the 16 lowest HDR image values, the next lowest LDR image value may map to the next 16 lowest HDR image values, and so on with each LDR image value mapping to 16 HDR image values.

In FIG. 7B, the HDR to LDR gain may vary. Region 1 of FIG. 7B may be a region with a low HDR to LDR gain, while region 2 may be a region with the highest HDR to LDR gain of the three regions in FIG. 7B, and region 3 may be a region with a lower HDR to LDR gain than that of region 2.

In various embodiments, region 2 of FIG. 7B may correspond to image values within a region of interest, such as a hotspot, to image values that may be more important, such as image values that are around that of human irradiance values, or to image values that would otherwise be advantageous to transfer with higher fidelity/accuracy. The HDR to LDR gain of regions 1 and 3 may be lower than region 2, in order to accommodate the higher resolution of region 2.

FIG. 7C shows a representation of the counts of the image values within a HDR image and the corresponding LDR image. In FIG. 7C, the x-axis may correspond to the range of image values available within the respective images and the y-axis may correspond to the counts of the image values (e.g., the frequency of each image value).

In FIG. 7C, the HDR to LDR transfer function may be created using a histogram. That is, the slope of the transfer function for each HDR image value may be proportional to the amplitude of the histogram for that same HDR value. In FIG. 7C, this may result in the highest frequency/occurrence of image values near the middle of the available image values, while having smaller counts of image values near the extreme ends of the HDR dynamic range. In such a distribution, the relative counts of various image values may be retained during the HDR to LDR transfer.

The techniques and processes described herein may be used to process images. The techniques described herein may transform images through several phases. FIGS. 8A-D illustrate various images captured and/or processed by an imaging system in accordance with an embodiment of the disclosure.

Figure 8A:
FIGS. 8A-D illustrate various images captured and/or processed by an imaging system in accordance with an embodiment of the disclosure.
Figure 8B:
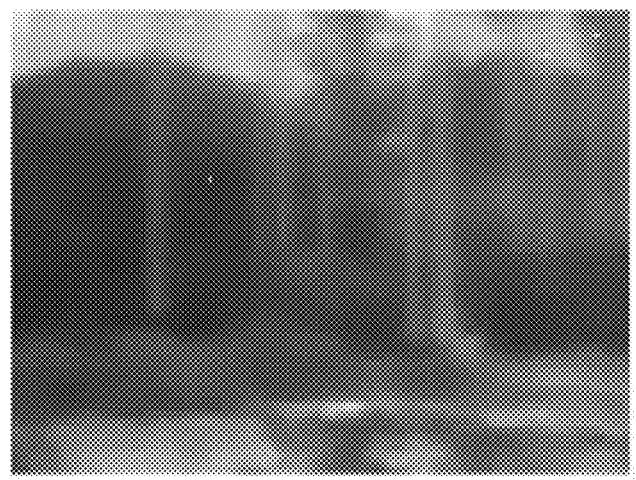
Figure 8C:

FIG. 8A may show an original image captured by an imaging system. The image captured in FIG. 8A may be a radiometric HDR image that depicts a thermal reading of a scene. FIG. 8B may show a LDR version of the image of FIG. 8A a reduced dynamic range image that has been processed with a HDR to LDR transfer function. Also, additional filtering may also have been applied to the image of FIG. 8A before or after the image has been processed by the HDR to LDR transfer function. The image of FIG. 8B may be a LDR image received by a receiving device. FIG. 8C may show a version of the image of FIG. 8B that has been processed with an inverse transfer function to recreate an HDR radiometric image. The forward (HDR to LDR) transfer function may create an LDR image that, in some sense, may be optimal for viewing by a human observer. This LDR image may not preserve the relative signal differences within the HDR image, but may instead maximize the signal differences within the LDR image (as well as, possibly, the reconstructed HDR image) to more clearly show differences within the image.

Figure 8D:
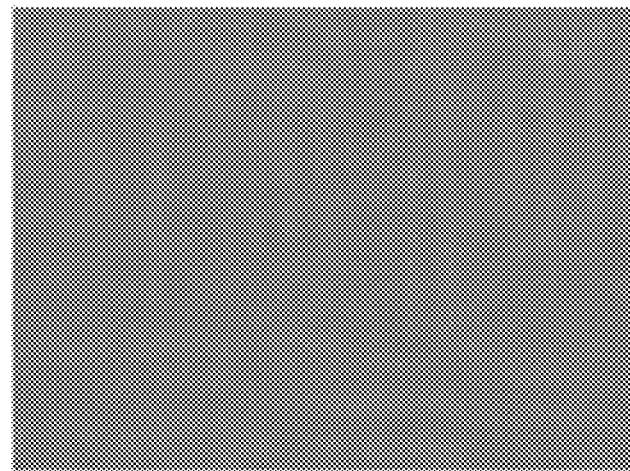

FIG. 8D may be a visualization of reconstruction error. In thermal imaging applications, the error may represent an absolute temperature measurement comparison between the images of FIGS. 8A and 8C. FIG. 8D may show the differences in temperatures between corresponding pixels or regions of pixels of FIGS. 8A and 8C. As shown in FIG. 8D, there is only very slight differences between FIGS. 8A and 8C. In fact, the maximum difference in temperature between the corresponding pixels of FIGS. 8A and 8C is 15.64 mK (0.01564 degrees Kelvin/Celsius). As such, the process described herein may allow accurate transfer of HDR radiometric images over a low bitrate interface.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
   receiving, by a system comprising a processor and memory, a high dynamic range (HDR) radiometric thermal image comprising a plurality of pixels, wherein each pixel is associated with a HDR thermal image value;
   converting, with the processor and the memory the transfer function, the HDR radiometric thermal image to a low dynamic range (LDR) radiometric thermal image comprising a plurality of pixels, wherein each pixel is associated with a LDR thermal image value, wherein the converting provides a lower HDR to LDR compression for the HDR thermal image values in a vicinity of one or more points of interest than at any other point, each point of interest being determined as at least one of:
   a center region of the HDR radiometric thermal image,
   a HDR thermal image value radiometrically associated with a human irradiance level,
   a HDR thermal image value radiometrically associated with human temperature, and/or
   a hotspot within the HDR radiometric thermal image; and transmitting the inverse transfer function and the LDR radiometric thermal image to a receiving device.

2. The method of claim 1, further comprising:
receiving the LDR radiometric thermal image with the receiving device; and
converting, with the receiving device, the LDR radiometric thermal image to a reconstructed thermal image.

3. The method of claim 2, further comprising:
filtering at least a portion of the HDR radiometric thermal image;
compressing the LDR radiometric thermal image, wherein transmitting the LDR radiometric thermal image comprises transmitting the compressed LDR radiometric thermal image; and
uncompressing, with the receiving device after receiving the LDR radiometric thermal image, the LDR radiometric thermal image received.

4. The method of claim 1, wherein said converting comprises:
determining a count of unique HDR thermal image values within the HDR thermal image; and
associating each of the unique HDR thermal image values to a LDR thermal image value.

5. The method of claim 4, wherein said converting further comprises:
comparing the count to an amount of available LDR thermal image values;
determining that the amount is higher than the count; and
associating each of the unique HDR thermal image values to a unique LDR thermal image value.

6. The method of claim 4, wherein said converting further comprises:
determining a HDR range of the unique HDR thermal image values;
determining a LDR range of LDR thermal image values; and
associating the HDR range to the LDR range on a monotonically increasing basis.

7. The method of claim 4, wherein associating each of the unique HDR thermal image values comprises associating HDR thermal image values to LDR thermal image values according to an HDR to LDR compression.

8. A system for performing the method of claim 7, the system comprising:
at least one infrared detector configured to capture HDR radiometric thermal images and output the captured HDR radiometric thermal images; and
a logic device configured to receive the HDR radiometric thermal images outputted by the at least one infrared detector and perform the method of claim 7.

9. The method of claim 1, wherein at least one point of interest is determined as a HDR thermal image value radiometrically associated with human temperature.

10. The method of claim 1, at least one point of interest is determined as a HDR thermal image value radiometrically associated with a human irradiance level.

11. A system comprising a logic device associated with a camera, the logic device configured to:
receive a high dynamic range (HDR) radiometric thermal image comprising a plurality of pixels wherein each pixel is associated with a HDR thermal image value;
convert the HDR radiometric thermal image to a low dynamic range (LDR) radiometric thermal image comprising a plurality of pixels, wherein each pixel is associated with a LDR thermal image value, wherein the converting provides a lower HDR to LDR compression for the HDR thermal image values in a vicinity of one or more points of interest than at any other point, each point of interest being determined as at least one of:
a center region of the HDR radiometric thermal image,
a HDR thermal image value radiometrically associated with a human irradiance level,
a HDR thermal image value radiometrically associated with human temperature, and/or
a hotspot within the HDR radiometric thermal image; and
transmit the LDR radiometric thermal image to a receiving device.

12. The system of claim 11, further comprising at least one camera configured to capture HDR radiometric thermal images and output the HDR radiometric thermal images to the logic device, wherein the camera is configured to output the HDR radiometric thermal images to the logic device over a network.

13. The system of claim 12, further comprising a plurality of cameras configured to capture HDR radiometric thermal images, wherein the logic device is further configured to:
receive HDR radiometric thermal images from each of the plurality of cameras, each HDR radiometric thermal image comprising a plurality of pixels wherein each pixel is associated with a HDR thermal image value;
convert the HDR radiometric thermal images to low dynamic range (LDR) radiometric thermal images;
transmit the LDR radiometric thermal images to a receiving device.

14. The system of claim 11, wherein the logic device is further configured to:
filter at least a portion of the HDR radiometric thermal image; and
compress the LDR radiometric thermal image before transmitting the LDR radiometric thermal image, wherein transmitting the LDR radiometric thermal image comprises transmitting the compressed LDR radiometric thermal image.

15. The system of claim 11, wherein said converting comprises:
determining a count of unique HDR thermal image values within the HDR thermal image; and
associating each of the unique HDR thermal image values to a LDR thermal image value.

16. The system of claim 15, wherein said converting further comprises:
comparing the count to an amount of available LDR thermal image values;
determining that the amount is higher than the count; and
associating each of the unique HDR thermal image values to a unique LDR thermal image value.

17. The system of claim 15, wherein said converting further comprises:
determining a HDR range of the unique HDR thermal image values;
determining a LDR range of LDR thermal image values; and
associating the HDR range to the LDR range on a monotonically increasing basis.

18. The system of claim 11, wherein at least one point of interest is determined as a HDR thermal image value radiometrically associated with a human irradiance level.

19. The system of claim 11, wherein at least one point of interest is determined as a HDR thermal image value radiometrically associated with human temperature.

20. A receiving device comprising a receiving controller configured to:

receive a LDR radiometric thermal image; and
convert the LDR radiometric thermal image to a reconstructed thermal image, wherein the converting provides a lower HDR to LDR compression for the HDR thermal image values in a vicinity of one or more points of interest than at any other point, each point of interest being determined as at least one of:
  a center region of the HDR radiometric thermal image,
  a HDR thermal image value radiometrically associated with a human irradiance level,
  a HDR thermal image value radiometrically associated with human temperature, and/or
  a hotspot within the HDR radiometric thermal image.

21. The receiving device of claim 20, wherein at least one point of interest is a HDR thermal image value radiometrically associated with a human irradiance level and/or with human temperature.

* * * * *

UNITED STATES PATENT AND TRADEMARK OFFICE
CERTIFICATE OF CORRECTION

PATENT NO. : 10,623,667 B2
APPLICATION NO. : 15/922512
DATED : April 14, 2020
INVENTOR(S) : Högasten et al.

It is certified that error appears in the above-identified patent and that said Letters Patent is hereby corrected as shown below:

In the Specification

Column 16, Line 31, change "FIG. 6 illustrates, a high" to --FIG.6 illustrates a high--

In the Claims

Column 18, Lines 51-52, Claim 1 change "the memory the transfer function, the HDR radiometric" to --the memory, the HDR radiometric--

Column 19, Line 1, Claim 1 change "transmitting the inverse transfer function and the LDR" to --transmitting the LDR--

Column 19, Line 54, Claim 10 "claim 1, at least" to --claim 1, wherein at least--

Signed and Sealed this
Sixteenth Day of June, 2020

Andrei Iancu
*Director of the United States Patent and Trademark Office*